United States Patent
Shaber

(10) Patent No.: US 9,677,931 B2
(45) Date of Patent: Jun. 13, 2017

(54) DETECTION OF RADIATION QUANTA USING AN OPTICAL DETECTOR PIXEL ARRAY AND PIXEL CELL TRIGGER STATE SENSING CIRCUITS

(71) Applicant: KONINKLIJKE PHILIPS N.V., Eindhoven (NL)

(72) Inventor: Mezbah Uddin Shaber, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 4 days.

(21) Appl. No.: 14/784,993

(22) PCT Filed: Apr. 3, 2014

(86) PCT No.: PCT/EP2014/056633
§ 371 (c)(1),
(2) Date: Oct. 16, 2015

(87) PCT Pub. No.: WO2014/173644
PCT Pub. Date: Oct. 30, 2014

(65) Prior Publication Data
US 2016/0084703 A1    Mar. 24, 2016

(30) Foreign Application Priority Data
Apr. 24, 2013 (EP) .................................... 13165097

(51) Int. Cl.
*G01T 1/20* (2006.01)
*G01J 1/44* (2006.01)
(Continued)

(52) U.S. Cl.
CPC *G01J 1/44* (2013.01); *G01T 1/00* (2013.01); *G01T 1/208* (2013.01); *G01T 1/2018* (2013.01); *G01T 1/248* (2013.01)

(58) Field of Classification Search
CPC .................................. G01T 1/248; G01T 1/249
See application file for complete search history.

(56) References Cited

U.S. PATENT DOCUMENTS

| 5,293,044 A | 3/1994 | Klingenbeck-Regn et al. |
| 7,187,316 B1 | 3/2007 | DeGeronimo |
| (Continued) | | |

FOREIGN PATENT DOCUMENTS

| CN | 102538988 A | 7/2012 | |
| DE | WO 2006111883 A2 * | 10/2006 | ........... G01T 1/1642 |
| (Continued) | | | |

OTHER PUBLICATIONS

Degenhardt, C., et al.; The Digital Silicon Photomultiplier—A Novel Sensor for the Detection of Scintillation Light; 2009; IEEE Nuclear Science Symposium Conference Record; pp. 2383-2386.
(Continued)

*Primary Examiner* — Casey Bryant

(57) ABSTRACT

A radiation detection device integrates the number of optical photons in a light pulse. The radiation detection device includes an optical detector pixel array which has a plurality of pixel cells that are triggered by optical photons, a plurality of pixel cell trigger state sensing circuits, and a summing unit. Each pixel cell trigger state sensing circuit generates a digital signal having either a first predetermined amplitude indicative of a triggered pixel cell, or a second predetermined amplitude indicative of a non-triggered pixel cell. The summing unit generates an analog signal whose amplitude corresponds to the number of triggered pixel cells and thereby performs the integration. The analog signal may further cause a timing unit to generate a timestamp when a predetermined accumulated optical photon count condition is met.

16 Claims, 9 Drawing Sheets

(51) Int. Cl.
  *G01T 1/208* (2006.01)
  *G01T 1/24* (2006.01)
  *G01T 1/00* (2006.01)

(56) References Cited

U.S. PATENT DOCUMENTS

| | | |
|---|---|---|
| 2003/0218129 A1 | 11/2003 | Rather |
| 2005/0104003 A1 | 5/2005 | Jarron |
| 2008/0099689 A1* | 5/2008 | Nygard ................. G01T 1/2018 250/370.09 |
| 2008/0191139 A1 | 8/2008 | Coello et al. |
| 2009/0268067 A1* | 10/2009 | Sugiyama .............. H04N 5/378 348/294 |
| 2011/0133091 A1 | 6/2011 | Frach et al. |
| 2012/0056078 A1* | 3/2012 | Eldesouki ............ H04N 5/3745 250/214 DC |
| 2012/0057059 A1 | 3/2012 | Eldesouki et al. |
| 2012/0068050 A1 | 3/2012 | Mazzillo et al. |
| 2012/0228484 A1 | 9/2012 | Burr |

FOREIGN PATENT DOCUMENTS

| | | |
|---|---|---|
| EP | 1069439 A2 | 1/2001 |
| EP | 2469294 A1 | 6/2012 |
| EP | 2512125 A2 | 10/2012 |
| WO | 2006111883 A2 | 10/2006 |

OTHER PUBLICATIONS

Frach, T., et al.; The Digital Silicon Photomultiplier-Principle of Operation and Intrinsic Detector Performance; 2009; IEEE Nuclear Science Symposium Conference Record; pp. 1959-1965.

Gallivanoni, A., et al.; Monolithic active quenching and picosecond timing circuit suitable for large-area single-photon avalanche diodes; 2006; Optics Express; 14(12)5021-5030.

Spanoudaki, V. C., et al.; Photo-Detectors for Time of Flight Positron Emission Tomography (ToF-PET); 2010; Sensors; 10:10484-10505.

* cited by examiner

DETECTION OF RADIATION QUANTA USING AN OPTICAL DETECTOR PIXEL ARRAY AND PIXEL CELL TRIGGER STATE SENSING CIRCUITS

CROSS-REFERENCE TO PRIOR APPLICATIONS

This application is the U.S. National Phase application under 35 U.S.C. §371 of International Application No. PCT/IB2014/056633, filed on Apr. 3, 2014, which claims the benefit of European Patent Application No. 13165097.0, filed on Apr. 24, 2013. These applications are hereby incorporated by reference herein.

FIELD OF THE INVENTION

The present invention relates to the detection of radiation quanta and finds application in high energy particle physics applications and in microscopy. Such applications encompass the direct detection of radiation quanta in the form of optical photons in fluorescence microscopy and from Cherenkov radiation, as well as the indirect detection of radiation quanta by means of the optical photons produced by a scintillator element. The invention finds particular application in PET imaging systems and in fluorescence lifetime imaging microscopy (FLIM), and even more particularly the invention can be used in time-of-flight (TOF) PET imaging systems.

BACKGROUND OF THE INVENTION

In PET imaging a radiotracer is administered to a subject such as a patient or an animal prior to its positioning in a PET imaging region. The radiotracer is preferentially absorbed by regions in the subject and its distribution is imaged following an uptake period. Subsequently a clinician interprets the relative uptake in particular regions in the images and may perform a diagnosis of the subject. The radiotracer undergoes radioactive decay which results in the production of positrons. Each decay event produces one positron which travels up to a few millimeters in human tissue where it subsequently interacts with an electron in an annihilation event that produces two oppositely-directed gamma photons. The two gamma photons each have an energy of 511 keV and are subsequently detected by gamma photon detectors disposed radially around the PET imaging region which each produce an electrical signal when struck by an incident gamma photon. In a gamma photon detector, defined herein to comprise a scintillator element in optical communication with an optical detector, the scintillator element converts the high energy gamma photon into a scintillation light pulse comprising a number of optical photons, and the electrical signal is generated by the optical detector. A timestamp is issued to each electrical signal by a timestamping unit and compared to other timestamps in a coincidence determination unit. Two gamma photons are identified as coincident if their timestamps occur within a narrow time interval of each other; typically if they are within +/−3 ns. The positions of the two detectors receiving the coincident gamma photons define a line in space along which the annihilation event occurred, the line being termed a line of response (LOR). Such LORs are subsequently reconstructed to produce an image illustrative of the distribution of the radiotracer within the imaging region.

In such systems the identification of pairs of gamma photons as coincident events is often further supported by an integration unit. The integration unit computes the energy of each incident gamma photon by integrating the total number of optical photons present in each scintillation light pulse. If the energies of each of the time-wise coincident gamma photons are within a predetermined range that is characteristic of a gamma photon the time-wise coincident scintillation light pulses are processed as coincident events. However, if the energy of one or both of the gamma photons lies outside the predetermined range the pair of time-wise coincident events are rejected. Such rejected events may be the consequence of gamma photon scattering; a phenomenon which changes the gamma photon trajectory as well as its energy and therefore leads to an erroneous LOR.

The integration and timing of light pulses from directly-detected radiation quanta in applications such as microscopy and Cherenkov radiation detection is carried out in much the same way. In fluorescence microscopy for example the optical photons are detected directly, thus in the absence of a scintillator element. Cherenkov radiation is likewise detected directly, thus in the absence of a scintillator element, the optical photons being generated by a dielectric medium.

The integration and timing of light pulses is therefore a common feature of such imaging systems. Both factors affect the image resolution of images generated by such systems. Conventionally an array of optical detectors is used to detect such a light pulse. The scintillation light pulse is distributed across the detectors in the array, each of which is typically capable of distinguishing the detection of individual optical photons, and the signals from the detectors are analyzed by the separate integration and timing units. Silicon photomultiplier (SiPM) arrays, and single photon avalanche diode (SPAD) arrays have both been used in this respect. Both analogue and digital SiPMs and SPADs have been used, wherein the analogue devices generate an avalanche current pulse in response to the detection of an optical photon, and the digital devices include additional electronic circuitry which causes an output signal to transition between two voltage levels.

Patent application WO2006/111883A2 discloses a circuit for use with a SiPM detector array in integrating and timing such light pulses. In WO2006/111883A2, digital triggering circuitry is configured to output a trigger signal indicative of a start of an integration time period responsive to a selected number of detector cells transitioning from a first digital value to a second digital value. Readout digital circuitry accumulates a count of a number of transitions of detector cells of the array of detector cells from the first digital state to the second digital state over the integration time period.

Another, more conventional, circuit used with analogue silicon photomultiplier (SiPM) optical detectors in connection with integrating and timing optical pulses is disclosed in document *Photo-Detectors for Time of Flight Positron Emission Tomography (ToF-PET)*, Spanoudaki and Levin, *Sensors* 2010, 10, 10484-10505. In this document, a group of analogue SiPM detectors are connected in parallel to generate a composite signal from such an optical pulse. The composite signal may then be integrated, and may cause a timing unit to generate a timestamp when a threshold level is exceeded.

However there remains room for improvement in terms of the integration of the number of optical photons in such an optical pulse, and further in the timing of the optical pulse.

SUMMARY OF THE INVENTION

It is an object of the invention to improve the integration of the number of optical photons in a light pulse. It is a further object of the invention to improve the timing of such a light pulse. A device, a method, a system and a computer program product are disclosed in relation to the invention.

These objects are achieved by a radiation detection device comprising an optical detector pixel array which has a plurality of pixel cells that can be triggered by optical photons, a plurality of pixel cell trigger state sensing circuits, and a summing unit. According to the invention, each pixel cell is in communication with a pixel cell trigger state sensing circuit that is configured to generate a digital signal having either a first predetermined amplitude indicative of a triggered pixel cell, or a second predetermined amplitude indicative of a non-triggered pixel cell. The summing unit is configured to receive the digital signals from the plurality of pixel cell trigger state sensing circuits and to generate an analogue signal having an amplitude that corresponds to the number of triggered pixel cells in the optical detector pixel array.

Owing to the amplitudes of the digital signals generated by each pixel cell trigger state sensing circuit being predetermined amplitudes, the amplitude of the analogue signal generated by the summing unit corresponds to one of a plurality of predetermined levels and therefore accurately indicates the accumulated number of triggered pixel cells. Consequently the analogue signal corresponds to the accumulated number of optical photons in the optical pulse; and is thus an integration of the number of optical photons in the light pulse. The change in the analogue signal over time, which represents the detected number of optical photons in the optical detector pixel array, may advantageously also indicate material properties such as fluorescence lifetime in microscopy applications.

Furthermore, because the analogue signal corresponds to the detection of the accumulated number of optical photons it thus relates to a defined point on the optical photon detection profile and may also be used in the timing of a light pulse. The analogue signal may therefore be used to cause more repeatable timing measurements.

By contrast prior art WO2006/111883A2 discloses to integrate the number of optical photons in a light pulse using shift register circuitry. Such an approach in which the total number of optical photons is determined by clocking-out the digital states of each pixel cell using shift registers and summing them in digital summing circuitry results in a delay of several clock periods before the result of the integration is available. In the present invention the analogue signal generated by the summing unit is generated in real-time response to the triggering of the pixel cells. Consequently the result of the summation, thus the result of the integration is available in real-time, thereby providing real-time timing information and permitting a faster decision on the validity of an optical pulse to be made. The present invention also represents a simplification of the approach in the prior art because the result of the integration is available real-time through the signal amplitude; thus no clocking-out circuitry or digital adder circuitry is required in the present invention.

In contrast to the approach detailed in prior art Spanoudaki and Levin; owing to the signal amplitudes generated by each pixel cell trigger state sensing circuit in the present invention being predetermined amplitudes, the analogue signal generated by the summing unit in the present invention corresponds to the number of detected optical photons. In the prior art the signal produced by connecting analogue SiPM devices in parallel results in a composite avalanche current having an unreliable magnitude owing to the statistics of the avalanche process. Consequently in the present invention the analogue signal provides a more repeatable and more reliable integration of the number of detected optical photons. The analogue signal is also a more repeatable timing signal that may subsequently be used to cause a timing unit to generate a timestamp.

According to another aspect of the invention each pixel cell trigger state sensing circuit is further configured to receive a reset signal; and each pixel cell trigger state sensing circuit is configured to hold the amplitude of the digital signal with the amplitude indicative of a triggered pixel cell until a reset signal is received. The ability to reset each pixel cell within the period of a light pulse permits a pixel cell to count more than one optical photon in this period, advantageously permitting the counting of light pulses with higher optical photon incidence rates.

According to another aspect of the invention the digital signal is a digital current signal and the summing unit is a current summing unit. Digital currents can advantageously be rapidly switched and summed in electronic circuitry, thereby improving the speed of the integration.

According to another aspect of the invention the pixel cells are SiPM or SPAD pixel cells and the pixel cell trigger state sensing circuits are formed on the same substrate as the SiPM or SPAD pixel cells. By forming the pixel cell trigger state sensing circuits on the same substrate, for example the same silicon wafer, as the pixel cells, a faster integration is achieved because their reduced separation, stray capacitance and series resistance leads to a reduced signal propagation delay.

According to another aspect of the invention a differential summing configuration is disclosed which has the benefits of reduced susceptibility the detrimental effects of drift, leakage currents and nonlinearity occurring in the practical generation of digital signals. In accordance with this aspect, each pixel cell trigger state sensing circuit has a first output and a second output. The first output is configured to generate the digital signal; and the second output is configured to generate the complementary digital signal to the first output. The radiation detection device further comprises a second summing unit and a differencing unit. The first summing unit is configured to receive the digital signals from the first outputs of the plurality of pixel cell trigger state sensing circuits and to generate an analogue signal having an amplitude that corresponds to the number of triggered pixel cells. The second summing unit is configured to receive the digital signals from the second outputs of the plurality of pixel cell trigger state sensing circuits and to generate an analogue signal having an amplitude that corresponds to the number of non-triggered pixel cells. Furthermore the differencing unit is configured to generate an analogue signal indicative of the number of triggered pixel cells by subtracting the analogue signal generated by the second summing unit from the analogue signal generated by the first summing unit.

According to another aspect of the invention an analogue to digital converter is further provided in communication with the at least a first summing unit; wherein the analogue to digital converter is configured to generate a digital signal corresponding to the analogue signal. Advantageously the digital signal may be more easily processed by other parts of a system comprising the radiation detection device. In for example a coincidence determination unit such signals may advantageously be more easily compared with other signals in order to improve the certainty with which a pair of time-wise coincident events are deemed to originate from the same gamma photon.

According to another aspect of the invention, in the differential summing configuration the digital signal is a digital current signal and each pixel cell trigger state sensing circuit includes a current source and at least a first switch for selectively electrically connecting the current source to the first output or to the second output such that the current source is connected to the first output if a pixel cell is triggered or connected to the second output if a pixel cell is not triggered. Digital currents may advantageously be rapidly switched and summed in electronic circuitry, thereby improving the speed of the integration.

According to another aspect of the invention a timing function is implemented and the radiation detection device further comprises a comparator and a timing unit. The comparator receives the analogue signal and compares it with a threshold level; and causes the timing unit to generate a timestamp indicative of the time when the analogue signal reaches the threshold level. Advantageously a simpler implementation of a timing function is provided because the integration unit and the timing function share some electronic circuitry.

According to another aspect of the invention the generated timestamp is indicative of the time of detection of a predetermined accumulated number of optical photons. The accumulated number of optical photons detected corresponds to the accumulated number of triggered pixel cells. Advantageously a more reliable timestamp is generated because by generating the timestamp based on the detection of a predetermined accumulated number of optical photons, the timestamp relates to the same, and thus a more repeatable point on optical pulse detection profile.

According to another aspect of the invention each radiation detection device further comprises a scintillator element in optical communication with the optical detector pixel array. The radiation detection device further comprises an energy determination unit; wherein the energy determination unit is configured to receive the analogue signal indicative of the number of triggered pixel cells and to compute the energy of a radiation quant incident on the scintillator element based on the amplitude of the analogue signal. The correspondence between the energy and the number of detected optical photons; thus the number of triggered pixel cells, used in the computation may be determined using a scaling factor generated from calibration or prediction data from a radiation quant.

According to another aspect of the invention the pixel cells in the radiation detection device are actively quenched SiPM pixel cells. Actively quenched pixel cells have a fast recovery time as compared to passively quenched cells, thereby permitting the detection of higher rates of optical photon incidence in the optical detector array.

According to another aspect of the invention a PET imaging system comprising a plurality of radiation detection devices is disclosed wherein each radiation detection device further comprises a scintillator element in optical communication with an optical detector pixel array. The use of the radiation detection devices in a PET imaging system permits a more reliable determination of the gamma photon energy. This improves the certainty with which a pair of time-wise coincident events are deemed to originate from the same gamma photon, thereby permitting the generation of higher resolution images by such a system.

According to another aspect of the invention a timing method for use in PET imaging, fluorescence microscopy or Cherenkov radiation detection comprising one or more method steps disclosed in relation to the radiation detection device is disclosed. Advantageously the method results in a real-time analogue signal that corresponds to the number of triggered pixel cells.

According to another aspect of the invention a computer program product comprising computer executable instructions to perform one or more method steps in accordance with the method steps of the invention is disclosed. The computer program product may be a computer-readable storage medium, such as a floppy disc, a magnetic hard drive, a USB drive, an optical disc, ROM or RAM and furthermore the computer executable instructions may be downloadable.

DETAILED DESCRIPTION OF THE INVENTION

In order to improve the integration of the number of optical photons in a light pulse, and further to improve the timing of such a pulse, the present invention is described with reference to gamma photon detection in a PET imaging system. However, it is to be appreciated that the invention also finds application in the broader field of high energy particle physics, including the detection of Cherenkov radiation, and in microscopy.

In PET imaging the detection of gamma photons is carried out by a plurality of gamma photon detectors. Such gamma photon detectors are typically disposed radially about a PET imaging region in order to receive gamma photons therefrom. In operation, each gamma photon detector, comprising a scintillator element in optical communication with an optical detector, responds to the reception of a gamma photon by the creation of a scintillation light pulse in the scintillator element. The optical detector, which may be an optical detector pixel array comprising one or more pixel cells that can be triggered by the optical photons, responds to the detection of the optical photons by generating electrical signals. The process of timing the reception of gamma photons is fundamental to PET imaging in which the originating positions of gamma photons are determined through coincidence. This timing process is typically performed by one or more timestamping units wherein a timestamping unit assigns timestamps to received gamma photons. As described above, the process of determining the energy of each gamma photon is also important in PET imaging, particularly in determining the validity of time-wise coincident events, and this is typically determined by one or more integration units. Conventionally the timestamping unit and the integration unit receive signals from the optical detector pixel array and communicates the results to a coincidence determination unit where a decision on the coincidence of pairs of events is made.

Figure 1:
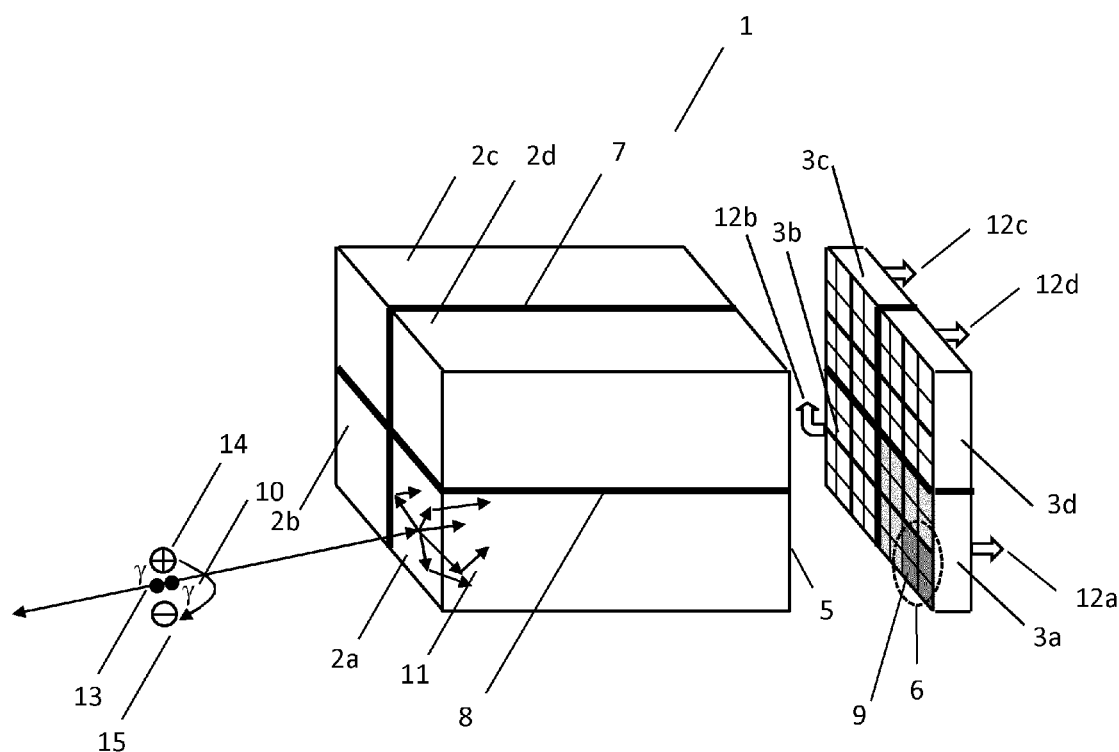
FIG. 1 illustrates a plurality of gamma photon detectors in accordance with certain aspects of the invention.

FIG. 1 illustrates a plurality of gamma photon detectors in accordance with certain aspects of the invention. In FIG. 1 a plurality of gamma photon detectors 1 is shown wherein each gamma photon detector comprises a scintillator element 2a, 2b, 2c or 2d in optical communication with a corresponding optical detector pixel array 3a, 3b, 3c, or 3d. For ease of illustration only four gamma photon detectors are shown in FIG. 1, and it is to be appreciated that the construction may be repeated in order to receive gamma photons from an enlarged reception area. The plurality of gamma photon detectors 1 may for example be disposed radially about the imaging region of a PET imaging system. For ease of illustration, scintillator elements 2a, 2b, 2c, 2d in FIG. 1 are illustrated as being separated from their corresponding optical detector pixel array 3a, 3b, 3c, 3d; however in practice face 5 of exemplary scintillator element 2a and face 6 of its corresponding optical detector pixel array 3a may be in intimate contact, or optically coupled by means of an optically index-matching layer in order to facilitate optical communication between the two. Furthermore in FIG. 1, the individual scintillator elements exemplified by 2a, 2b, 2c, 2d may be optically isolated from one another by means of reflective light barrier layers 7, 8 in order to prevent the coupling of scintillation light between neighboring scintillator elements. Such reflective light barrier layers 7, 8 may also be used on all surfaces of scintillator elements 2a, 2b, 2c, 2d other than the optical interface with the optical detector pixel array shown in FIG. 1. In this way, scintillation light generated within a scintillator element is retained within that scintillation element until it is detected by its corresponding optical detector pixel array. In operation, a gamma photon detector, exemplified by scintillator element 2a and its corresponding optical detector pixel array 3a shown shaded in FIG. 1, is responsive to the reception of radiation quanta such as gamma photon 10. Gamma photon 10 may be one of a pair of oppositely-directed gamma photons 10, 13 formed as a consequence of an annihilation event following radioactive decay, wherein the radioactive decay produces positron 14 and is annihilated by electron 15. The source of the radioactive decay may be for example a radiotracer. The reception of gamma photon 10 by scintillator element 2a results in the generation of scintillation light 11 which is retained within scintillator element 2a by a combination of total internal reflection and layers 7, 8 until its detection by optical detector pixel array 3a, resulting in electrical signals at array electrical output 12a. Optical detector pixel array 3a comprises one or more optical detector pixels 6, shown as dark shaded in FIG. 1, wherein each optical detector pixel 6 comprises one or more pixel cells 9. The smallest optical detector element is therefore a pixel cell 9 which may be for example a silicon photomultiplier (SiPM) connected in the Geiger mode.

Figure 2:
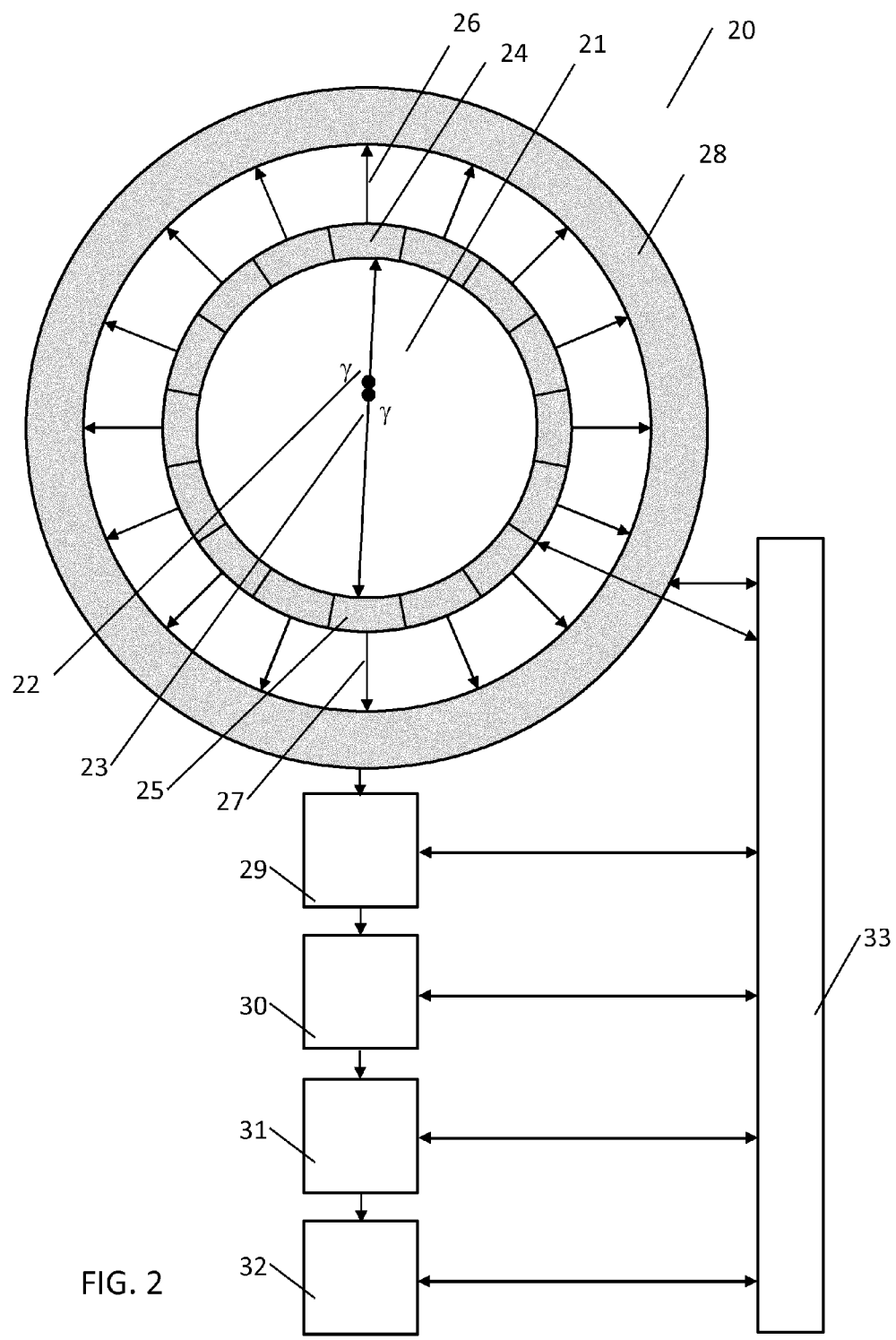
FIG. 2 illustrates an exemplary PET imaging system in accordance with certain aspects of the invention.

FIG. 2 illustrates an exemplary PET imaging system in accordance with certain aspects of the invention. The exemplary gamma photon detectors of FIG. 1 may for example be used in the system illustrated in FIG. 2. In FIG. 2, PET imaging system 20 comprises a plurality of gamma photon detector modules exemplified by gamma photon detector modules 24, 25 disposed about imaging region 21. Each gamma photon detector module 24, 25 may comprise one or more gamma photon detectors such as the gamma photon detector formed by the combination of items 2a and 3a in FIG. 1. Each gamma photon detector within a gamma photon detector module 24, 25 produces electrical signals indicative of the reception of gamma photons, the electrical signals from which are received by timestamping unit 28 via a bus. Whilst illustrated as a single unit, timestamping unit 28 may be replicated such that one or more timestamping units are associated with each gamma photon detector module 24 thereby providing timestamping functionality locally to the gamma photon detector at which a gamma photon is received. In operation the detection of exemplary gamma photons 22, 23 by gamma photon detector modules 24, 25 respectively results in electrical signals that are received by timestamping unit 28 via bus 26, and bus 27 respectively. Each bus 26, 27 represents the one or more array electrical outputs 12a, 12b, 12c, 12d in FIG. 1 of the one or more gamma photon detectors within each gamma photon detector module 24, 25. Returning to FIG. 2, timestamping unit 28 issues at least a timestamp indicative of the time of reception of each received gamma photon. An integration unit may also be included within timestamping unit 28 to integrate the scintillation light associated with each gamma photon in order to determine its energy. Timestamping unit 28 is in communication with coincidence determination unit 29 which identifies received gamma photons as coincident if their timestamps occur within a narrow time interval of each other, typically +/−3 ns. Coincidence determination unit 29 may further analyze the energy associated with each received gamma photon and reject time-wise coincident gamma photons which have a gamma photon with an energy lying outside a predetermined energy window. Coincidence determination unit 29 is in communication with reconstruction processor 30 which constructs a line of response for each pair of received gamma photons deemed coincident and further processes multiple such lines of response in order to reconstruct data representing an image of the originating positions of the coincident gamma photons using techniques such as filtered back projection and iterative reconstruction. In time of flight (TOF) PET the reconstruction processor may further take into account the small time difference between received coincident gamma photons in order to better localize their originating position. In depth-of-interaction (DOI) PET the trajectories of the two detected gamma photons may further be assessed in order to improve the spatial resolution of the reconstructed image by reducing parallax errors. Reconstruction processor 30 is in further communication with image processing unit 31 which is configured to process the data representing the originating positions of the coincident gamma photons into a format suitable for presentation of an image on an output device. Image processing unit 31 is in further communication with output device 32 such as a display, a printer and the like which presents an image. Control unit 33 is in communication with all described units of the PET imaging system and coordinates the operations described above.

When in use, a portion of a subject to be imaged such as portion of a human or animal body is positioned in imaging region 21 of the exemplary PET imaging system in FIG. 2. The portion may be an organ within a subject in which it is desired to measure the uptake of a radiotracer. Prior to the positioning of the portion of the subject in the imaging region 21, a radiotracer may be administered to the subject, and an uptake period may be permitted to lapse. During the imaging process a plurality of gamma photon detectors 1 receive gamma photons resulting from radioactive decay events within the imaging region 21, for example from the decay of a radiotracer administered to a subject. Following the imaging process PET imaging system 20 produces an image indicative of the distribution of the radiotracer within imaging region 21.

Figure 3:
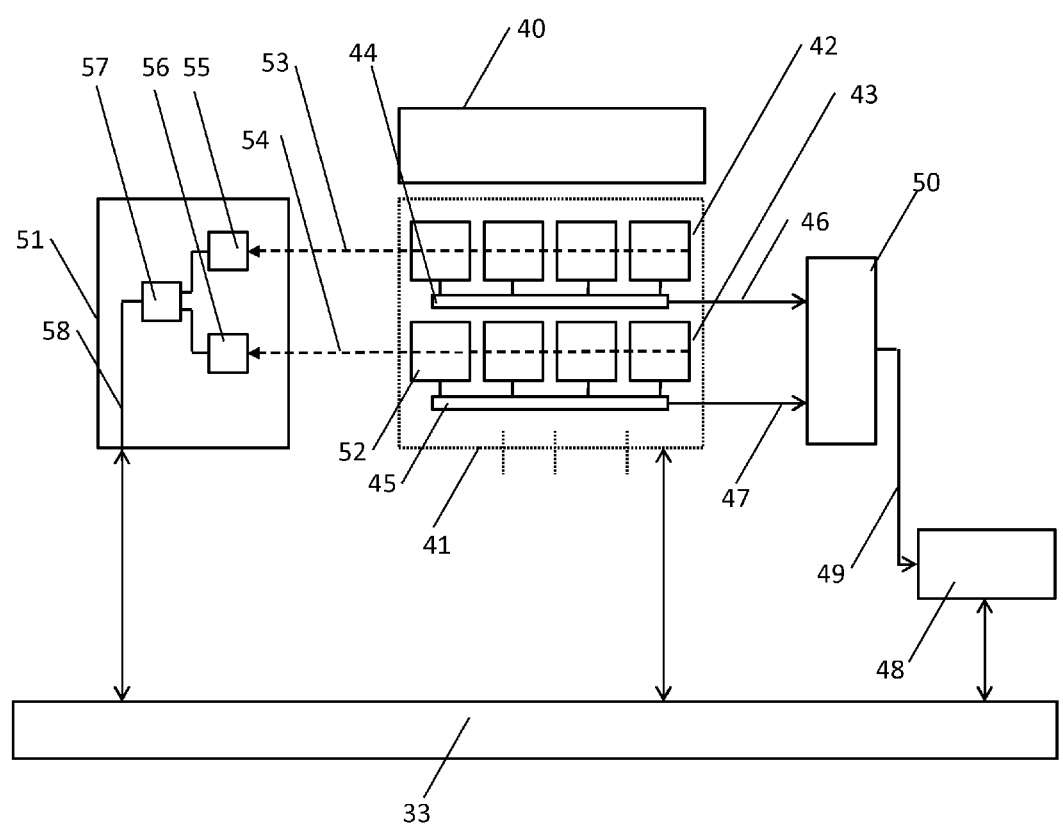
FIG. 3 illustrates features of a prior art timing scheme used in a Philips Digital Photon Counting (PDPC) system.

In order to highlight the benefits of the present invention, FIG. 3 illustrates features of a prior art timing scheme used in a Philips Digital Photon Counting (PDPC) system. Such a system is disclosed in patent application WO2006/111883A2. In prior art FIG. 3, scintillator element 40 is in optical communication with optical detector pixel array 41 to form a gamma photon detector. A plurality of such gamma photon detectors may be used in the PET imaging system 20 illustrated in FIG. 2. Returning to prior art FIG. 3, scintillation light generated within scintillator element 40 is detected by pixel cells within optical detector pixel array 41. Optical detector pixel array 41 comprises one or more optical detector pixels wherein each optical detector pixel comprises a plurality of pixel cells 52. A pixel cell may be a single photon avalanche diode (SPAD), otherwise known as a silicon photomultiplier (SiPM), and may be operated in the Geiger mode. In operation a SiPM, or a pixel cell is initially reset such that its output is in a logical false state. The reception of an optical photon by a SiPM results in the breakdown of its junction and the triggering of a logical true state at its output. The smallest optical detector element in optical detector pixel array 41 is therefore a pixel cell 52 wherein each pixel cell can be enabled and disabled individually and its logical output can be read out. In one configuration an optical detector pixel has a pitch of approximately 4 mm and a pixel cell has a pitch of approximately 50 microns. An optical detector pixel may therefore comprise thousands of pixel cells. Pixel cells within optical detector pixel array 41 are arranged in rows, as exemplified by pixel cell rows 42, 43 of which only two are shown for ease of illustration. There may be one or more such pixel cell rows. With respect to the timing function performed in prior art FIG. 3; row trigger logic 44, 45 performs a logical OR operation on the logical state of all pixel cells in its corresponding pixel cell row 42, 43 and is used to generate a digital row trigger signal at row trigger outputs 46, 47 respectively. A row trigger output 46, 47 is therefore set into a logical true state when one or more of the pixel cells in its corresponding pixel cell row 42, 43 have been triggered into a logical true state. Timing unit 48 is configured to generate a timestamp indicative of the time of reception of a gamma photon by scintillator element 40 when signal 49 generated by trigger logic unit 50 is in a true logic state. In one configuration, trigger logic unit 50 performs an OR operation on the signals at row trigger outputs 46, 47, and consequently timing unit 48 is caused to generate a timestamp when any one of the pixel cells in optical detector pixel array 41 is triggered into a logical true state by an optical photon.

With respect to the integration function performed in prior art FIG. 3; integration unit 51 is used to determine the energy of each received gamma photon by integrating the number of optical photons in its scintillation light pulse. The gamma photon energy is a useful parameter in applications such as PET imaging in which a coincidence determination unit may use it to improve the discrimination between scattered and non-scattered gamma photons and thereby improve the certainty with which a pair of time-wise coincident events are deemed to originate from the same gamma photon. Integration unit 51 operates by clocking-out the status of each pixel cell, exemplified by pixel cell 52, in each pixel cell row 42, 43, as a digital word for each row at pixel status signal outputs 53 and 54 respectively using a shift register, and adding the digital words using sequential adder circuits 55 and 56 and adder circuit 57 to generate a digital word indicative of the number of triggered pixel cells. Control unit 33 coordinates the various operations described above, may further receive timestamps from timing unit 48 and the result of the integration from integration unit 51, and may further control their transfer to coincidence determination unit 29 within PET imaging system 20 illustrated in FIG. 1.

Figure 4:
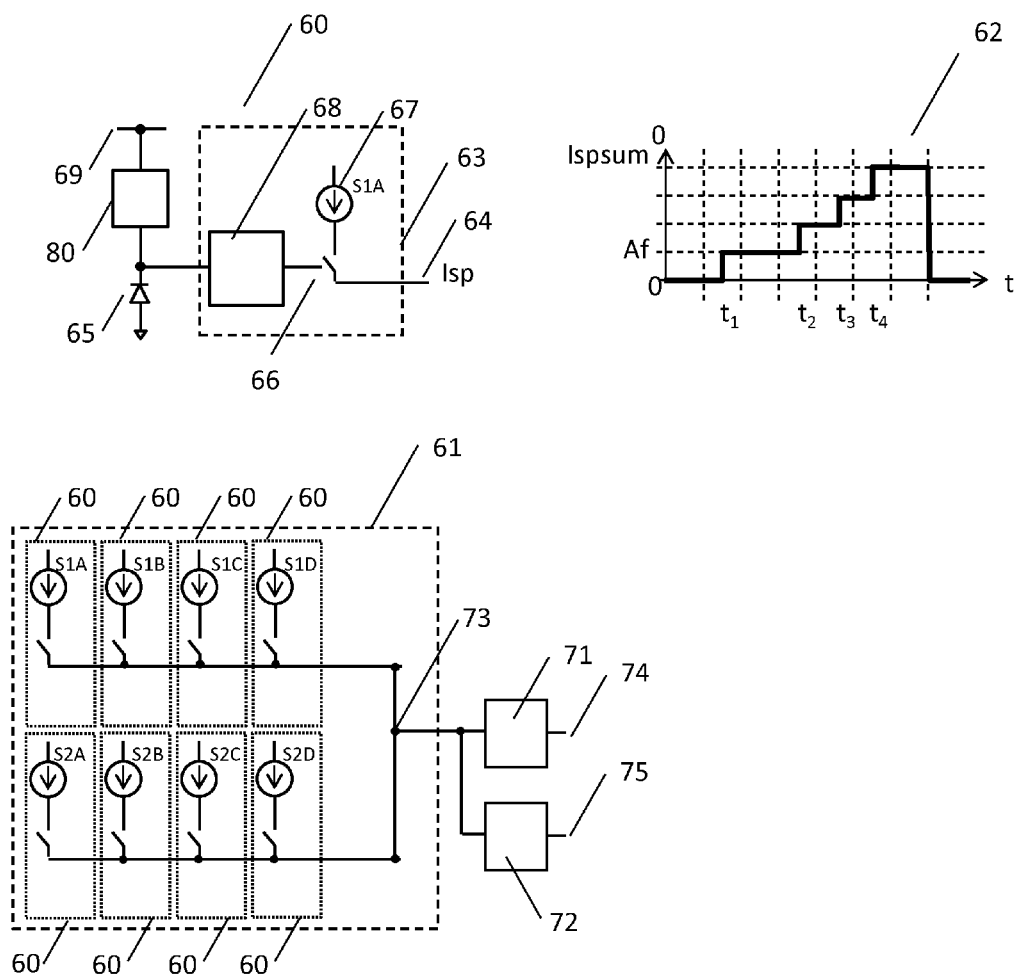
FIG. 4 illustrates aspects of a first embodiment of the invention in which a pixel cell circuit 60, a radiation detection device 61 and a current waveform 62 are shown.

In the present invention a different approach is taken to the integration and the generation of a timing trigger signal. FIG. 4 illustrates aspects of a first embodiment of the invention in which a pixel cell circuit 60, a radiation detection device 61 and a current waveform 62 are shown. With reference to FIG. 4, in the present invention a pixel cell trigger state sensing circuit 63 is configured to generate a digital signal (Isp) having either a first predetermined amplitude indicative of a triggered pixel cell or a second predetermined amplitude indicative of a non-triggered pixel cell. In the pixel cell trigger state sensing circuit 63 illustrated in FIG. 4 the digital signal is a digital current signal that is generated at first output 64. It will be appreciated however that alternative embodiments in which the digital signal is either a digital charge signal comprising a discrete packet of charge, or a digital voltage signal are also within the scope of the disclosure.

In the embodiment illustrated in FIG. 4 the digital signal is a digital current signal and the first predetermined amplitude is a non-zero amplitude and the second predetermined amplitude is a zero amplitude. In one example the first predetermined amplitude is 1 microamp and the second predetermined amplitude is 0 microamps. In a second example the first predetermined amplitude is 1 microamp and the second predetermined amplitude is a leakage current having a value at least ten times less than the first predetermined amplitude. Other suitable values for first predetermined amplitude lie in the range from approximately 100 nanoamps to tens of microamps. The first and second predetermined amplitudes are thus distinguishable. Consequently in FIG. 4, switch 66 is either in a conductive state such that current source 67 is conducted to output 64, or a non-conductive state. Other configurations of pixel cell trigger state sensing circuit 63 are also contemplated in which the first and second predetermined amplitudes are distinguishable; for example making the first predetermined amplitude a positive amplitude and the second predetermined amplitude a negative amplitude. One or more current sources and or switches may be used in such configurations. Likewise, in embodiments in which the digital signal is a digital charge signal, the amplitude, thus the discrete packet of charge, should be distinguishable for the two predetermined amplitudes. This may be achieved for example through differences in magnitude or sign of the charge packet. It will be appreciated that with alternative embodiments in which the digital signal is a digital voltage signal, that the first and second amplitude of the voltage signals should likewise be distinguishable.

In operation, when avalanche photodiode 65, which may be for example a SiPM or a SPAD pixel cell, is in a non-triggered state, switch 66 is in a non-conductive state such that current source 67 is disconnected from first output 64 and consequently the digital current signal generated at first output 64 has the second predetermined amplitude. When an optical photon is received by avalanche photodiode 65, avalanche photodiode 65 transitions into a triggered state in which an avalanche current flows in avalanche photodiode 65. Comparator 68 is configured to sense the avalanche current, and to cause switch 66 to transition into a conductive state such that current source 67 is connected to first output 64 and consequently the digital current signal generated at first output 64 has the first predetermined amplitude. In this way the pixel cell trigger state sensing circuit 63 generates a digital signal at first output 64 in real-time response to the triggering of photodiode 65 by an optical photon. By real-time it is meant that this is achieved in the absence of any clocking-out period inherent in alternative approaches that use a shift register to read-out digital signals. The real-time signal may be subjected to the time for closing switch 66 and the risetime of the RC propagation delay resulting from stray capacitance and series resistance in practical electronic circuitry but this is considered real-time as such propagation delays can be arranged to be in the order of picoseconds using standard circuit layout techniques. The digital signal is subsequently held in the triggered state until the pixel cell trigger state sensing circuit 63 is reset. A reset operation may be effected after the integration has completed, and such an asynchronous or synchronous reset signal may be generated by a local timing circuit or effected by a control unit. The asynchronous reset signal may for example cause a reset operation a fixed time interval after the detection of a predetermined number of optical photons by pixel cells in the optical detector pixel array. In one contemplated embodiment a reset operation may be activated within the period of a light pulse such that the integration of the total number of optical photons in the light pulse is executed in more than one stage in order to count higher rates of optical photon incidence.

Avalanche photodiode 65 in FIG. 4 may be an analogue or a digital SiPM since the operation of the pixel cell trigger state sensing circuit 63 is to provide a signal having one of two predetermined amplitudes. Various means for configuring comparator 68 to sense the avalanche current may be implemented using for example MOS switches and techniques known to those skilled in the art. A latch for holding the amplitude of the digital signal with the amplitude indicative of a triggered pixel cell may also be included in the photodiode circuitry or in the pixel cell trigger state sensing circuit 63. Avalanche photodiode 65 is biased by bias voltage supply 69 into the Geiger mode and may include active or passive quenching circuitry 80. Active quenching circuitry advantageously reduces the photodiode recovery time as compared to passive quenching circuitry such as a resistor.

Radiation detection device 61 in FIG. 4 illustrates a connection of a plurality of pixel cell circuits 60, together with an optional current to digital converter circuit 71 and an optional trigger level circuit 72. The photodetectors in the eight exemplary pixel cell circuits 60 form a pixel cell array, although a pixel cell array may be formed with other numbers of pixel cells. The position of each current source is identified in each of the two rows as S1A-S1D, and S2A-S2D respectively. In the radiation detection device 61 shown in FIG. 4, the digital currents generated by each of the individual pixel cell circuits 60 are summed together by a summing unit implemented by summing junction 73 at which the total current represents the combined status of all of the pixel cells in the exemplary array. Since the current, thus the signal, generated by each of the individual pixel cell circuits 60 is a digital signal with a predetermined amplitude, the amplitude of the total current at summing junction 73 is an analogue current, or signal, which corresponds to one of a plurality of predetermined levels indicative of the number of triggered pixel cells in the exemplary optical detector pixel array. Without any further processing it therefore performs the function of an integration unit. Consequently the signal is indicative of the energy of a gamma photon giving rise to a scintillation light pulse. Since the currents generated by each of the individual pixel cell circuits 60 are, as described above, generated in real-time response to the triggering of pixel cells in pixel cell circuits 60, by summing the currents in this way the analogue signal is also generated in real-time response to the triggering of the pixel cells. Again, by real-time it is meant that this is subject to the risetime of the RC propagation delay resulting from stray capacitance and series resistance in practical electronic circuitry, although, as described above, this is considered real-time as such propagation delays can be arranged to be in the order of picoseconds using standard circuit layout techniques. Advantageously, because the analogue signal is generated in real-time response to the triggering of the pixel cells, the integration technique provides the result of the integration in real-time, thereby permitting a rapid decision on the validity of a scintillation light pulse to be made. Furthermore, since the amplitude of this signal represents the detection of an accumulated number of optical photons it provides an accurate timing signal. In this way it represents an improvement in the timing of such a scintillation light pulse. Summing junction 73 may further comprise a resistor connected to a fixed potential such as ground potential for converting the current into an analogue voltage signal whose amplitude is in the same way indicative of the number of triggered pixel cells within the optical detector pixel array.

By way of an example, current waveform 62 in FIG. 4 illustrates the current at summing junction 73 from a row of pixel cells consequent to the detection of four optical photons, received at times t1, t2, t3 and t4 respectively when the first predetermined amplitude is a positive amplitude and the second predetermined amplitude is a zero amplitude. Current waveform 62 therefore represents the analogue signal generated by the summing unit, which in this exemplary case is implemented by summing junction 73. Initially there is zero current at summing junction 73, and each time an additional optical photon is detected the total current increases by a step having a predetermined amplitude (Af) indicative of a triggered pixel cell. Since the amplitude of each step is predetermined, the amplitude of the analogue signal corresponds to one of a plurality of predetermined levels which are indicative of the total number of triggered pixel cells, and furthermore immediately indicates the accumulated number of detected optical photons; thereby performing the desired integration.

In alternative embodiments in which the digital signal is a digital voltage signal, it will be appreciated that the digital voltage signals may be generated by selectively connecting a switch to one of two predetermined voltage levels, and that the summing of digital signals may be performed by summing the voltages using an analogue summing operational amplifier circuit in order to generate the desired analogue signal. In alternative embodiments in which the digital signal is a digital charge signal, it will be appreciated that discrete packets of charge representing the first and second predetermined amplitudes may be summed by a charge integrator in order to generate the desired analogue signal. With reference to FIG. 4, in one example implementation in which the digital signal is a digital charge signal the reception of an optical photon by avalanche photodiode 65 results in the closure of switch 66 for a predetermined interval (T) and the transfer of a packet of charge (Q) determined by the product of the current in current source 67 and the predetermined interval (T) to first output 64. The charge may be summed by a charge integrator that is for example implemented as a capacitor having a value (C), wherein the resulting change in voltage across the capacitor is determined by the ratio of the packet of charge to the capacitor value, thus (Q/C). A monostable or other one-shot triggering circuit may be used to control the timing of the closure of switch 66. Owing to leakage currents in practical implementations of such charge integrator circuits, at least the digital signal's first predetermined amplitude is furthermore desirably distinguishable from the net result of any leakage currents at the analogue signal generated by the charge integrator at the end of any integration period.

Optional current to digital converter circuit 71 connected to radiation detection device 61 in FIG. 4 may be used to provide a digitized signal at output 74, wherein the digitized signal is indicative of the current at summing junction 73. Such digitization facilitates the subsequent processing of the signal by a control unit or a coincidence determination unit. Suitable current to digital converters for this purpose include for example suitably configured operational amplifier circuits.

Optional trigger level circuit 72 connected to radiation detection device 61 in FIG. 4 may be used to cause a timing unit such as a time to digital converter to generate a timestamp indicative of the time of detection of a predetermined accumulated number of optical photons, thereby providing a more reliable timing signal. Optional trigger level circuit 72 may comprise a comparator for comparing the analogue signal at summing junction 73 with a predetermined threshold level, wherein the threshold level corresponds to a predetermined accumulated number of detected optical photons. In one envisaged configuration a timing unit such as a time to digital converter is caused to generate a timestamp when the accumulated number of optical photons exceeds a predetermined number, such as one or more optical photons. In so doing a more reliable and simplified timing scheme is provided.

Figure 5:
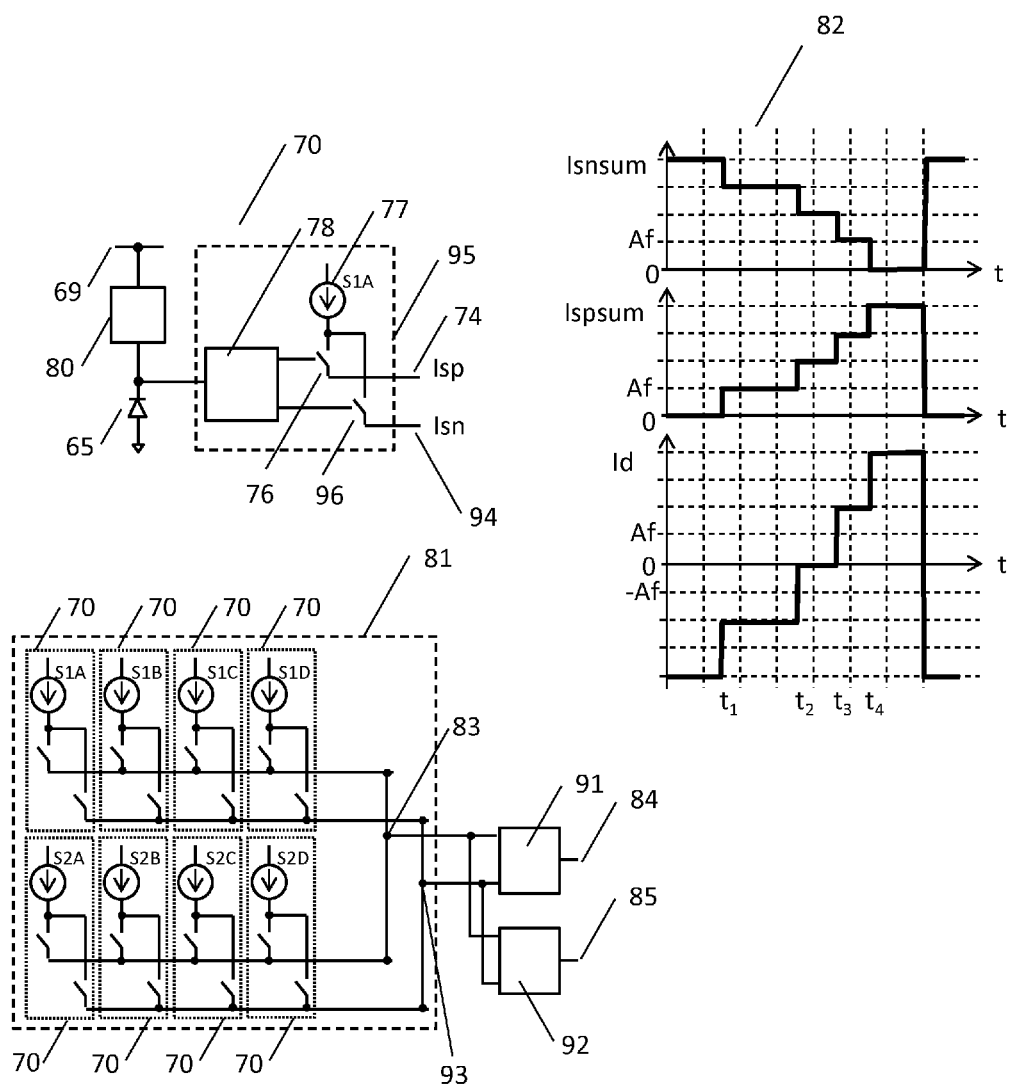
FIG. 5 illustrates aspects of a second embodiment of the invention in which a pixel cell circuit 70, a radiation detection device 81 and current waveforms 82 are shown.

FIG. 5 illustrates aspects of a second embodiment of the invention in which a pixel cell circuit 70, a radiation detection device 81 and current waveforms 82 are shown. FIG. 5 illustrates a development of the circuit illustrated in FIG. 4 which addresses non-linearity issues often encountered in current switches such as switch 66 illustrated in FIG. 4. With reference to pixel cell circuit 70 in FIG. 5, each current source has two outputs, a first output 74 which generates a signal (Isp), and a second output 94 which generates a signal (Isn). First output 74 operates in the same way as output 64 in FIG. 4, thus when avalanche photodiode 65 is in a non-triggered state, switch 76 is in a non-conductive state such that current source 77 is disconnected from first output 74 and consequently the digital current signal generated at first output 74 has a second predetermined amplitude. When an optical photon is received by avalanche photodiode 65, avalanche photodiode 65 transitions into a triggered state in which an avalanche current flows in avalanche photodiode 65. Comparator 78 is configured to sense the avalanche current, and to cause switch 76 to transition into a conductive state such that current source 77 is connected to first output 74 and consequently the digital current signal generated at first output 74 has a first predetermined amplitude. A latch for holding the amplitude of the digital signal with the amplitude indicative of a triggered pixel cell may also be included in the photodiode circuitry or in the pixel cell trigger state sensing circuit 63. Consequently the amplitude of the digital signal may be held in a triggered state until the pixel cell trigger state sensing circuit 95 is reset. A reset operation may be effected after the integration has completed, and such an asynchronous or synchronous reset signal may be generated by a local timing circuit or effected by a control unit. In one contemplated embodiment a reset operation may be activated within the period of a light pulse such that the integration of the total number of optical photons in the light pulse is executed in more than one stage in order to count a higher rate of optical photon incidence.

In the preferred embodiment illustrated in FIG. 5 the first predetermined amplitude is a non-zero amplitude and the second predetermined amplitude is a zero amplitude. In one example the first predetermined amplitude is 1 microamp and the second predetermined amplitude is 0 microamps. In a second example the first predetermined amplitude is 1 microamp and the second predetermined amplitude is a leakage current having a value at least ten times less than the first predetermined amplitude. Other suitable values for first predetermined amplitude lie in the range from approximately 100 nanoamps to tens of microamps. Importantly the first and second predetermined amplitudes are distinguishable. Thus in FIG. 5, switch 76 is either in a conductive state in which case current source S1A is conducted to output 74, or a non-conductive state. Other configurations of pixel cell trigger state sensing circuit 63 are also contemplated in which the first and second predetermined amplitudes are distinguishable; for example making the first predetermined amplitude a positive amplitude and the second predetermined amplitude a negative amplitude. Negative amplitudes may be effected by connecting the upper terminal of current source 77 with respect to a negative potential. Alternatively one or more current sources and or switches may be used in such configurations.

Second output 94 in pixel cell circuit 70 in FIG. 5 is configured to generate the complementary digital signal to the first output; thus when the digital current signal generated at first output 74 has a first predetermined amplitude the digital current signal generated at second output 94 has the second predetermined amplitude, and vice versa. One switch configuration that may be used to achieve this is illustrated in FIG. 5 although it is to be appreciated that other configurations including a single pole double throw switch may alternatively be used to control first output 74 and second output 94.

Comparator 78 in FIG. 5 operatively controls switches 76, 96 dependent upon the trigger state of avalanche photodiode 65 in accordance with the described complementary signals at first output 74 and second output 94. The complementary signals may for example be generated by a logic inverter constructed using MOS switches. Avalanche photodiode 65 in FIG. 5 is, as described with reference to FIG. 4, biased by bias voltage supply 69 into the Geiger mode and may include active or passive quenching circuitry 80.

Radiation detection device 81 in FIG. 5 illustrates a connection of a plurality of pixel cell circuits 70, together with a differential current amplifier 91 and an optional trigger level circuit 92. The photodetectors in the eight exemplary pixel cell circuits 70 form a pixel cell array, although a pixel cell array may be formed with other numbers of pixel cells. The position of each current source is identified in each of the two rows as S1A-S1D, and S2A-S2D respectively. In the radiation detection device 81 shown in FIG. 5, the currents generated by each of the first outputs of individual pixel cell circuits 70 are summed by a summing unit implemented by summing junction 83 at which the total current represents the combined trigger status of all of the pixel cells in the exemplary array.

Consequently the signal at summing junction 83 is an analogue signal whose amplitude corresponds to the number of triggered pixel cells within the optical detector pixel array. Without any further processing it therefore performs the function of an integration unit. Such a signal is also indicative of the energy of a gamma photon giving rise to a scintillation light pulse. Advantageously the result of the integration is provided quickly, thereby permitting a rapid decision on the validity of a scintillation light pulse to be made. However in order to address nonlinearity issues often associated with typical MOS switches that may be employed as switches 76 and 96, the combined complementary signals of all of the pixel cells in the exemplary array, thus the combined signal generated by all second outputs 94; are likewise summed by an additional summing unit implemented by summing junction 93, to produce a combined analogue signal at summing junction 93. As stated above, in a preferred embodiment the first predetermined amplitude is a non-zero amplitude and the second predetermined amplitude is a zero amplitude. In this way the analogue signal at summing junction 93 has an amplitude that corresponds to the number of non-triggered pixel cells. With further reference to radiation detection device 81 in FIG. 5, a differencing unit implemented as differential current amplifier 91 subtracts the current signal at second summing junction 93 from that at first summing junction 83 and generates an analogue representation of the difference in the two currents at output 84. Consequently a signal representative of the number of non-triggered cells is subtracted from a signal representative of the number of triggered cells. In so doing, the signal at output 84 is less susceptible to drift and leakage currents and nonlinearity effects occurring in practical implementations of switches 76, 96. With the predetermined signal amplitudes as described with reference to the preferred embodiment, the analogue representation of the difference in the two currents at output 84 is consequently indicative of the number of triggered pixel cells in the radiation detection device 81. Such an analogue signal may later be digitized in order to facilitate its subsequent processing by a control unit or a coincidence determination unit. Suitable current to digital converters for this purpose include for example suitably configured operational amplifier circuits.

Current waveforms 82 in FIG. 5 illustrates the combined current (Ispsum) at summing junction 83, the combined current (Isnsum) at summing junction 93 and the difference in these two currents (Id=Ispsum−Isnsum) at output 84 of differential current amplifier 84 for a row of pixel cells consequent to the detection of four optical photons, received at times t1, t2, t3 and t4 respectively. Initially there is zero current at summing junction 73, and each time an additional optical photon is detected the total current increases by a step having a predetermined amplitude (Af) indicative of a triggered pixel cell. Since the amplitude of each step is predetermined, the amplitude of the analogue signal corresponds to one of a plurality of predetermined levels which are indicative of the total number of triggered pixel cells, and furthermore immediately indicates the accumulated number of detected optical photons; thereby performing the desired integration.

With reference to FIG. 5 it is noted that summing junctions 83, 93 may alternatively each comprise an additional resistor connected to a fixed potential such as ground potential for converting the currents at junctions 83, 93 into analogue voltage signals whose difference in amplitude may be determined in a similar way by a differential voltage amplifier in place of differential current to digital converter 84 in FIG. 5. In this way a similar digital signal indicative of the number of triggered pixel cells within the optical detector pixel array may be generated.

Optional trigger level circuit 92 connected to radiation detection device 81 in FIG. 5 may be used to cause a timing unit such as a time to digital converter to generate a timestamp indicative of the time of detection of a predetermined accumulated number of optical photons, thereby providing a more reliable timing signal. Optional trigger level circuit 92 may comprise a differential current amplifier for subtracting the current at the second summing junction 93 from that at the first summing junction 83, and a comparator for comparing this difference signal with a predetermined threshold level, wherein the threshold level corresponds to a predetermined accumulated number of detected optical photons. In one envisaged configuration a timing unit such as a time to digital converter is caused to generate a timestamp when the accumulated number of optical photons exceeds a predetermined number, such as one or more optical photons. In so doing a more reliable and simplified timing scheme is provided.

Figure 6:
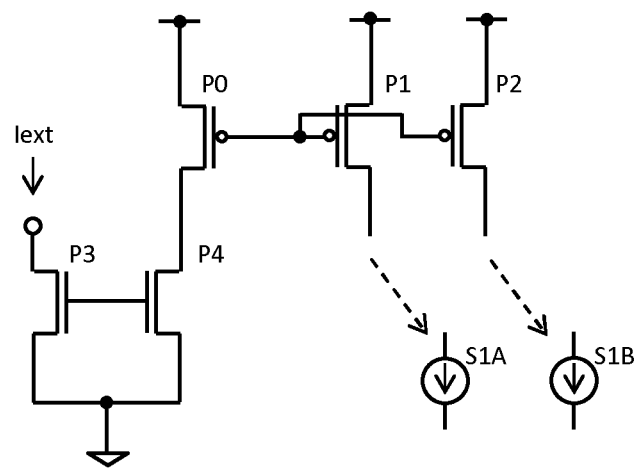
FIG. 6 illustrates an embodiment of a current source for use in accordance with some aspects of the invention.

FIG. 6 illustrates an embodiment of a current source for use in accordance with some aspects of the invention. Current sources S1A-S1D, and S2A-S2D in FIGS. 4 and 5 may be implemented using the current sources S1A, S1B illustrated in FIG. 6. In FIG. 6 a programming current (Iext) is used to program the current in NMOS device P3, which, via P4 sets the drain-source current in PMOS device P0. The drain-source currents in devices P1, P2 are consequently set by the current in device P0 multiplied by the ratio of the width to length ratio of the channel in each device P1, P2 as compared to that in P0. Multiple current sources may be implemented in the manner described by FIG. 6. Such devices may be implemented on the same silicon substrate as a SiPM or SPAD array where their reduced separation from their corresponding optical detector advantageously leads to a reduced RC signal propagation delay, or alternatively as external off-chip circuitry. Other current source embodiments are also suitable.

Figure 7:
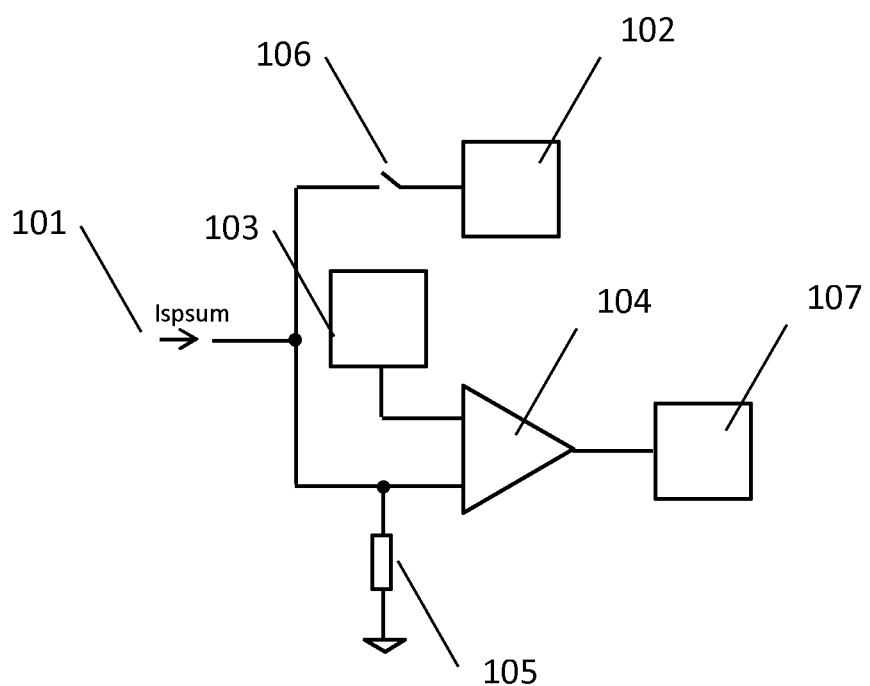
FIG. 7 illustrates an embodiment of a current to digital converter circuit 102 that may be used to implement the optional current to digital converter 71 illustrated in FIG. 4, and a trigger circuit 103, 104 that may be used to implement the optional trigger level circuit 72 illustrated in FIG. 4.

FIG. 7 illustrates an embodiment of a current to digital converter circuit 102 that may be used to implement the optional current to digital converter 71 illustrated in FIG. 4, and a trigger circuit 103, 104 that may be used to implement the optional trigger level circuit 72 illustrated in FIG. 4. In operation, common input 101 in FIG. 7 is connected to summing junction 73 in FIG. 4 to receive current Ispsum, the summed current from the first outputs 64 of all pixel cell trigger state sensing circuit 63 in a portion of the array. Resistor 105 converts the current Ispsum into a voltage. When sampling switch 106 is closed, analogue to digital converter 102 performs an analogue to digital conversion of the current Ispsum received by common input 101. The digital representation of current Ispsum may be subsequently processed in a coincidence determination unit in a PET imaging system in order to validate the coincidence of time-wise coincident events. Sampling switch 106 determines the time at which the conversion takes place, and may remain closed such that the result of the conversion is available real-time, or its closure may optionally be delayed, for example to wait until a timestamp has been triggered, in order to prevent prematurely commencing an integration result conversion. Advantageously the reset time associated with a falsely-started conversion is avoided since the conversion is only initiated when there is a higher level of confidence that the trigger for the timestamp originated from a valid optical pulse. Comparator 104 and optical photon trigger reference level 103 cooperate to cause timing unit 107 to generate a timestamp when a predetermined accumulated number of optical photons have been detected within a portion of the optical detector array. When a level indicative of a predetermined number of optical photons is exceeded by the current Ispsum, comparator 104 causes timing unit 107 to generate a timestamp. In so doing, more repeatable timing is provided because the timestamp relates to the same point on the profile of the detected optical pulse. Such devices illustrated in FIG. 7 may be fabricated on the same substrate as a SiPM or SPAD array, or alternatively as external off-chip circuitry. The circuit in FIG. 7 may furthermore be adapted to receive currents from junctions 83 and 93 in FIG. 5 and, using a differential amplifier configuration, subtract the currents at these junctions, to perform the same intended functions.

Figure 8:
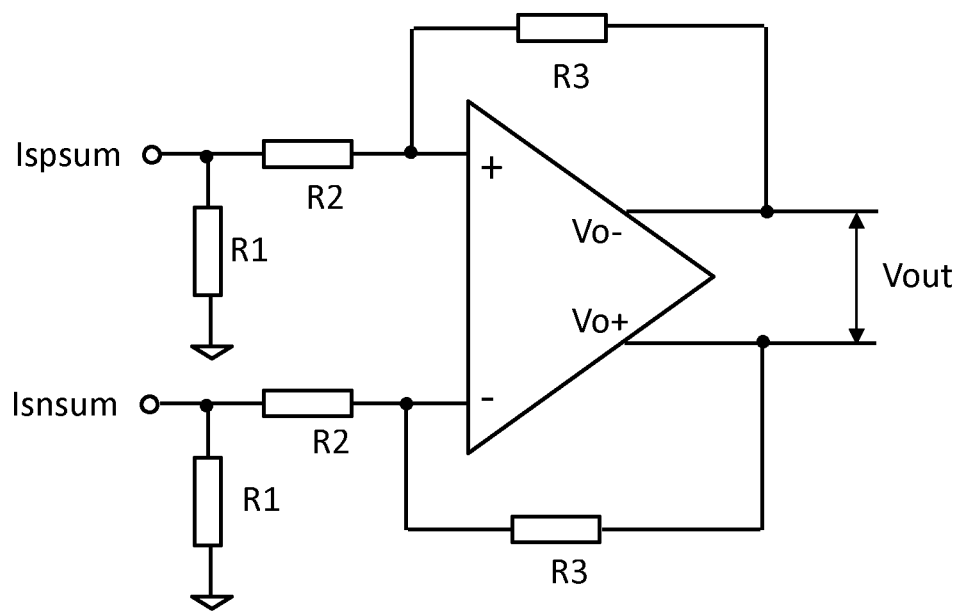
FIG. 8 illustrates an embodiment of a differential amplifier circuit that may be used to implement the differential current amplifier 91 illustrated in FIG. 5.

FIG. 8 illustrates an embodiment of a differential amplifier circuit that may be used to implement the differential current amplifier 91 illustrated in FIG. 5. The circuit in FIG. 8 receives currents Ispsum and Isnsum from first outputs 74, and second outputs 94 of the pixel cell trigger state sensing circuits 95 for a row of pixel cells such as pixel cell row 42, and generates an output voltage Vout that is proportional to the difference in currents (Ispsum Isnsum). The transimpedance gain may be set by adjusting resistor value R1, and the voltage gain may be set by adjusting the ratio of the resistor values (R3/R2). The output voltage Vout may subsequently be digitized by an analogue to digital converter in order to provide a signal indicative of the accumulated number of triggered pixel cells or optical photons that may be processed digitally in a coincidence determination unit.

Figure 9:
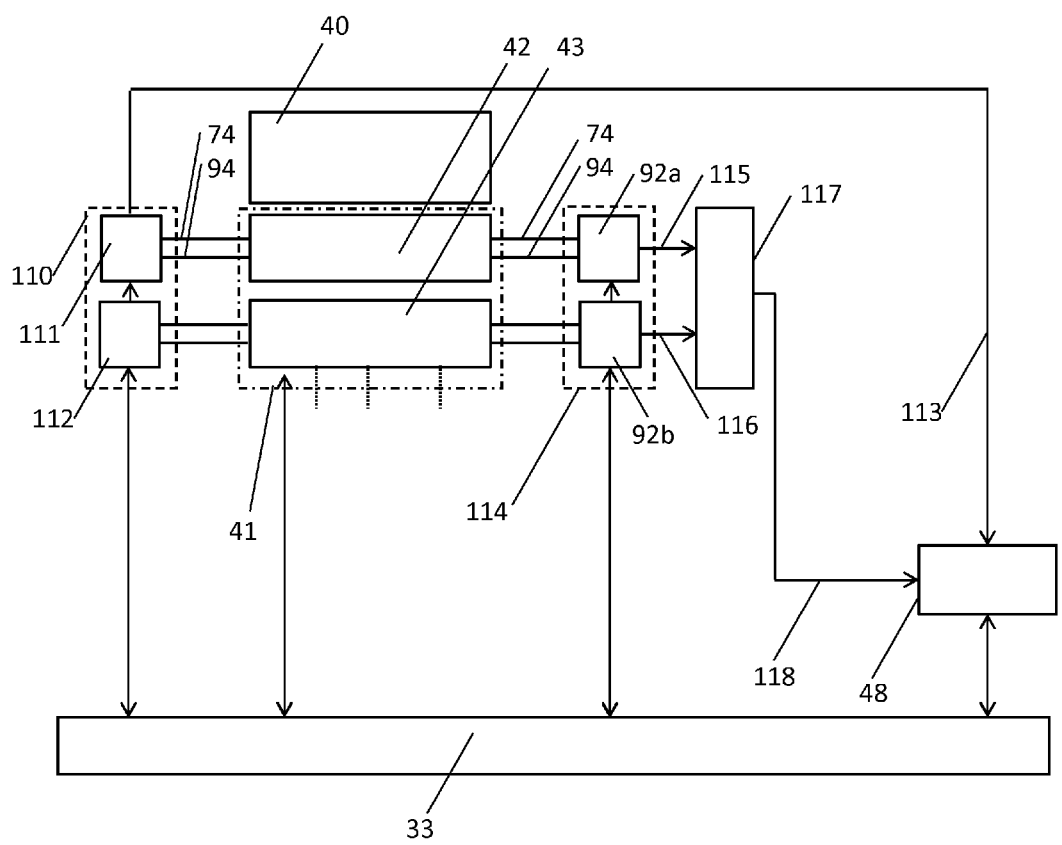
FIG. 9 illustrates a system implementation in accordance with some aspects of the invention.

FIG. 9 illustrates a system implementation in accordance with some aspects of the invention. The system implementation illustrated in FIG. 9 may be used in for example a PET imaging system in order to generate the signals necessary to determine and or validate coincidence in a coincidence determination unit. The operation of the system in FIG. 9 is described with reference to the second embodiment of a radiation detection device illustrated in FIG. 5 although it is to be appreciated that the system may also be adapted for use with the first embodiment illustrated in FIG. 4. With reference to FIG. 9, scintillator element 40 is in optical communication with optical detector pixel array 41 to form a gamma photon detector. A plurality of such gamma photon detectors may be used in the PET imaging system 20 illustrated in FIG. 2. Returning to FIG. 9, scintillation light generated within scintillator element 40 is detected by pixel cells within optical detector pixel array 41. Optical detector pixel array 41 comprises one or more optical detector pixels wherein each optical detector pixel comprises a plurality of pixel cells. A pixel cell may be a single photon avalanche diode (SPAD), otherwise known as a silicon photomultiplier (SiPM), and may be operated in the Geiger mode. In operation a SiPM, or a pixel cell is initially reset such that its output is in a logical false state. The reception of an optical photon by a SiPM results in the breakdown of its junction and the triggering of a logical true state at its output. The smallest optical detector element in optical detector pixel array 41 is therefore a pixel cell wherein each pixel cell can be enabled and disabled individually and its logical output can be read out. In one configuration an optical detector pixel has a pitch of approximately 4 mm and a pixel cell has a pitch of approximately 50 microns. An optical detector pixel may therefore comprise thousands of pixel cells. Pixel cells within optical detector pixel array 41 are arranged in rows, as exemplified by pixel cell rows 42, 43 of which only two are shown for ease of illustration. There may be one or more such pixel cell rows.

With respect to the integration function performed in the system illustrated in FIG. 9; integration unit 110, determines the energy of each gamma photon received by scintillator element 40 by integrating the number of optical photons in its scintillation light pulse. Integration unit 110 integrates the number of optical photons by determining the accumulated number of triggered pixel cells in at least a portion of optical detector array 41. In the illustration in FIG. 9 this portion corresponds to pixel cell rows 42, 43. Integration unit 110 comprises one or more differential current amplifiers 111, 112, wherein each differential current amplifier operates in accordance with the description of item 91 in FIG. 5. In the implementation illustrated in FIG. 9, each differential current amplifier 111, 112 is configured to receive combined current signal Ispsum from all first outputs 74 of the pixel cell trigger state sensing circuits 95 for all pixel cells in its respective row. A suitable configuration is illustrated in FIG. 5. Likewise, each differential current amplifier 111, 112 is configured to receive the combined current signal Isnsum from all second outputs 94 of the pixel cell trigger state sensing circuits 95 for all pixel cells in its respective row. In this way the output of each differential current amplifier 111, 112 is an analogue signal representing the number of triggered pixel cells in its respective row. The outputs of all differential current amplifiers for a portion of the array are then summed together to generate a signal indicative of the total number of triggered pixel cells, thus received optical photons, in that portion of the array. The summing may take place in a current or charge summing unit (not shown) which may exemplarily be implemented using operational amplifier circuits. Whilst the embodiment illustrated in FIG. 9 shows a configuration in which signals from one row of pixels are received by one differential current amplifier 111, 112, other configurations are also contemplated such as using one differential current amplifier to receive the signals from a plurality of rows. In another embodiment still, a further signal 113 may be derived from the signal indicative of the total number of triggered pixel cells in the portion of the array and used to validate a timestamp issued by timing unit 48 if the result of an integration meets a predetermined accumulated count condition, thus if the count exceeds, is equal to, is less than or is within a predetermined range of a predetermined value. In so doing the certainty of a timestamp resulting from a gamma photon may be improved. The gamma photon energy may consequently be used in coincidence determination unit 29 in the PET imaging system detailed in FIG. 2 where it may be used to improve the discrimination between scattered and non-scattered gamma photons and thereby determine the validity of a line of response. Control unit 33 in FIG. 9 coordinates the various operations described above, may further receive timestamps from timing unit 48 and the result of the integration from integration unit 51, and may further control their transfer to coincidence determination unit 29 in PET imaging system 20 illustrated in FIG. 1.

With respect to the timing function performed in the system illustrated in FIG. 9, a plurality of trigger circuits 114 cooperate with timestamp trigger unit 117 and timing unit 48 to generate a timestamp indicative of the time at which a predetermined number of optical photons have been detected within optical detector array 41. In practice, one or more trigger circuits are sufficient to perform the desired timing function of plurality of trigger circuits 114, wherein each trigger circuit 92a, 92b performs a current differencing operation as described with reference to unit 92 in FIG. 5. Thus, each trigger circuit 92a, 92b is configured to receive the combined current signal Ispsum from all first outputs 74 of the pixel cell trigger state sensing circuits 95 for all pixel cells in its respective row. Likewise, each trigger circuit 92a, 92b is configured to receive the combined current signal Isnsum from all second outputs 94 of the pixel cell trigger state sensing circuits 95 for all pixel cells in its respective row. In one configuration each trigger circuit 92a, 92b comprises a differential current amplifier for subtracting the current Isnsum from the current Ispsum and for generating an output signal at output 115, 116 in proportion to this difference. Outputs 115, 116 of each trigger circuit 92a, 92b are received by timestamp trigger unit 117 which generates a trigger signal at output 118 causing timing unit 48 to generate a timestamp if a predetermined accumulated triggered pixel count condition is met. The condition may be that the accumulated triggered pixel cell count is equal to, is less than or is within a predetermined range of a predetermined value. In so doing a repeatable timestamp indicative of the same point on a received optical photon profile may be generated. Timestamp trigger unit 117 receives the individual signals from the plurality of trigger circuits 114 and is configured to determine the total number of received optical photons in a portion of optical detector pixel array 41. In one envisaged configuration timestamp trigger unit 117 comprises a charge or a voltage summing amplifier for summing each of the signals output by outputs 115, 116 of the plurality of trigger circuits 114 and generating an output voltage in proportion to this sum, and a comparator which compares the sum with a signal indicative of a predetermined accumulated triggered pixel count. When the predetermined accumulated triggered pixel count condition is met, timestamp trigger unit 117 causes timing unit 48 to generate a timestamp by means of output 118. The timestamp may then be transmitted via control unit 33 to a coincidence determination unit, or in another embodiment it may be held in a buffer in timing unit 48 and only transmitted to control unit 33 if a validation signal 113 received from integration unit 110 indicates that a predetermined accumulated count condition set by integration unit 110 has been met. Advantageously the improved integration process results in a faster integration and thus a faster decision on the processing or otherwise rejection of the timestamp can be made. Consequently in cases when timing unit 48 is inadvertently caused to generate a timestamp by an invalid trigger signal at output 118, timing unit 48 may be reset after a shorter timestamp validation delay, improving the utilization of the timing unit. It will be appreciated that alternative implementations of FIG. 9 wherein circuit elements common to plurality of trigger circuits 114 and to integration unit 110 may be shared in combined circuitry, such as for example current to digital converter circuits, are also possible.

To summarize, a radiation detection device for integrating the number of optical photons in a light pulse has been described with particular reference to a PET imaging system. A system, a method and a computer program product have also been described for use in accordance with the device. The radiation detection device comprises an optical detector pixel array which has a plurality of pixel cells that can be triggered by optical photons, a plurality of pixel cell trigger state sensing circuits, and a summing unit. According to the invention, each pixel cell is in communication with a pixel cell trigger state sensing circuit that is configured to generate a digital signal having either a first predetermined amplitude indicative of a triggered pixel cell, or a second predetermined amplitude indicative of a non-triggered pixel cell. The summing unit is configured to receive the digital signals from a plurality of pixel cell trigger state sensing circuits and to generate an analogue signal having an amplitude that corresponds to the number of triggered pixel cells. The amplitude of the analogue signal is indicative of the desired integration operation; and may further be used in combination with a comparator to cause a timing unit to generate a timestamp when a predetermined accumulated optical photon count condition is met.

Whilst the invention has been illustrated and described in detail in the drawings and foregoing description, such illustrations and description are to be considered illustrative or exemplary and not restrictive; the invention is not limited to the disclosed embodiments and can be used for integrating the number of optical photons in light pulses and for timing light pulses resulting from the detection of radiation quanta in various applications within the fields of high energy particle physics and microscopy.

The invention claimed is:

1. A radiation detection device comprising:
  an optical detector pixel array having a plurality of pixel cells which can be triggered by optical photons;
  a plurality of pixel cell trigger state sensing circuits;
  at least a first current summing junction;
  wherein for at least a portion of the optical detector pixel array:
  each pixel cell is in communication with a pixel cell trigger state sensing circuit that is configured to generate a digital current signal having either a first predetermined amplitude indicative of a triggered pixel cell or a second predetermined amplitude indicative of a non-triggered pixel cell;
  wherein the first current summing junction is configured to receive the digital current signals from the plurality of pixel cell trigger state sensing circuits and to generate an analogue signal having an amplitude that corresponds to a real-time number of triggered pixel cells currently within the portion of the optical detector pixel array.

2. The radiation detection device according to claim 1 wherein each pixel cell trigger state sensing circuit is further configured to receive a reset signal; and each pixel cell trigger state sensing circuit is configured to hold the amplitude of the digital current signal with the amplitude indicative of a triggered pixel cell until a reset signal is received.

3. The radiation detection device according to claim 1 wherein the pixel cells are SiPM or SPAD pixel cells and the pixel cell trigger state sensing circuits are formed on the same substrate as the SiPM or SPAD pixel cells.

4. The radiation detection device according to claim 1 wherein each pixel cell trigger state sensing circuit has a first output and a second output;
  wherein the first output is configured to generate the digital current signal; and
  the second output is configured to generate the complementary digital current signal to the first output;
  the radiation detection device further comprising a second summing unit and a differencing unit;
  wherein the first summing unit is configured to receive the digital current signals from the first outputs of the plurality of pixel cell trigger state sensing circuits and to generate an analogue signal having an amplitude that corresponds to the number of triggered pixel cells;
  wherein the second summing unit is configured to receive the digital current signals from the second outputs of the plurality of pixel cell trigger state sensing circuits and to generate an analogue signal having an amplitude that corresponds to the number of non-triggered pixel cells;

wherein the differencing unit is configured to generate an analogue signal indicative of the number of triggered pixel cells by subtracting the analogue signal generated by the second summing unit from the analogue signal generated by the first summing unit.

5. The radiation detection device according to claim 1 further comprising an analogue to digital converter in communication with the at least a first summing unit; wherein the analogue to digital converter is configured to generate a digital signal corresponding to the analogue signal.

6. The radiation detection device according to claim 4 wherein each pixel cell trigger state sensing circuit includes a current source and at least a first switch for selectively electrically connecting the current source to the first output or to the second output such that the current source is connected to the first output if a pixel cell is triggered or connected to the second output if a pixel cell is not triggered.

7. The radiation detection device according to claim 1 further comprising a comparator and a timing unit; wherein the comparator is configured to receive the analogue signal and to compare the analogue signal with a threshold level; wherein the comparator is further configured to cause the timing unit to generate a timestamp indicative of the time when the analogue signal reaches the threshold level.

8. The radiation detection device according to claim 7 wherein the timestamp is indicative of the time of detection of a predetermined accumulated number of optical photons.

9. The radiation detection device according to claim 1 wherein each radiation detection device further comprises a scintillator element in optical communication with the optical detector pixel array; the radiation detection device further comprising an energy determination unit; wherein the energy determination unit is configured to receive the analogue signal indicative of the number of triggered pixel cells and to compute the energy of a radiation quant incident on the scintillator element based on the amplitude of the analogue signal.

10. The radiation detection device according to claim 1 wherein the pixel cells are actively quenched SiPM pixel cells.

11. A PET imaging system comprising a plurality of radiation detection devices according to claim 1; wherein each radiation detection device further comprises a scintillator element in optical communication with the optical detector pixel array.

12. An optical photon summation method for use in PET imaging, fluorescence microscopy, or Cherenkov radiation detection, the method comprising the steps of:
receiving signals from an optical detector pixel array indicative of the triggering of one or more pixel cells within the optical detector pixel array;
sensing the trigger state of the one or more pixel cells within the optical detector pixel array;
generating a digital current signal having either a first predetermined amplitude indicative of a triggered pixel cell or a second predetermined amplitude indicative of a non-triggered pixel cell;
summing the digital current signals to generate an analogue signal having an amplitude that corresponds to the real-time number of triggered pixel cells.

13. The optical photon summation method of claim 12 further comprising the method steps of:
comparing the analogue signal with a threshold level; and
generating a timestamp when the analogue signal reaches the threshold level.

14. A non-transitory computer-readable medium carrying computer executable instructions which control a processor to perform the method steps of claim 12.

15. The radiation detection device according to claim 1, wherein the pixel cells are connected in parallel.

16. A radiation detection device comprising:
an optical detector pixel array including a plurality of pixel cells configured to be triggered by optical photons, the pixel cells being connected in parallel, each pixel cell including:
a current source which outputs a current of a common, predetermined amplitude,
a switch connected between the current source and a summing junction to supply current of the predetermined amplitude to the summing junction, and
a light detector configured to close the switch in response to the receipt of light, such that an amplitude of the current at the summing junction is indicative of a number of pixel cells whose optical detector is currently receiving light;
an analog-to-digital converter configured to convert an amplitude of the current currently at the summing junction into a digital value; and
a trigger circuit configured to cause generation of a time stamp in response to the current amplitude at the summing junction reaching a preselected threshold.

* * * * *